United States Patent [19]

Crase

[11] Patent Number: 4,599,056
[45] Date of Patent: Jul. 8, 1986

[54] UNIVERSAL JOINT AND PROGRESSIVE CAVITY TRANSDUCER USING THE SAME

[75] Inventor: Gary M. Crase, Cypress, Calif.

[73] Assignee: Smith International, Inc., Newport Beach, Calif.

[21] Appl. No.: 683,730

[22] Filed: Dec. 19, 1984

Related U.S. Application Data

[63] Continuation of Ser. No. 461,937, Jan. 28, 1983, abandoned.

[51] Int. Cl.⁴ .......................... F03C 2/00; F16D 3/04
[52] U.S. Cl. ...................... 418/48; 418/182; 403/331; 403/381; 464/102
[58] Field of Search ............... 418/48, 182; 175/107; 464/102, 104; 403/331, 381, 382

[56] References Cited

U.S. PATENT DOCUMENTS

| | | | |
|---|---|---|---|
| 348,944 | 9/1886 | Allen | 403/331 |
| 481,780 | 8/1892 | Brown | 464/102 |
| 3,096,831 | 7/1963 | Adams | 403/331 |
| 3,567,348 | 3/1971 | Benson | 418/48 |
| 3,999,901 | 12/1976 | Tschirky | 418/48 |
| 4,080,115 | 3/1978 | Sims et al. | 418/48 |
| 4,237,704 | 12/1980 | Varadan | 418/48 |

FOREIGN PATENT DOCUMENTS

| | | | |
|---|---|---|---|
| 2514757 | 10/1976 | Fed. Rep. of Germany | 418/182 |
| 2536934 | 3/1977 | Fed. Rep. of Germany | 418/182 |
| 1236806 | 6/1960 | France | 403/381 |
| 1563182 | 3/1969 | France | 418/48 |
| 106476 | 12/1924 | Switzerland | 464/104 |
| 20713 | of 1902 | United Kingdom | 464/102 |

*Primary Examiner*—John J. Vrablik
*Attorney, Agent, or Firm*—Price, Gess & Ubell

[57] ABSTRACT

The invention relates to a universal joint composed of a driving member and a driven member connected through mortise and tenon joints extending perpendicularly to each other, suitable for connecting the rotor and shaft of a progressive cavity transducer such as a pump or motor.

1 Claim, 14 Drawing Figures

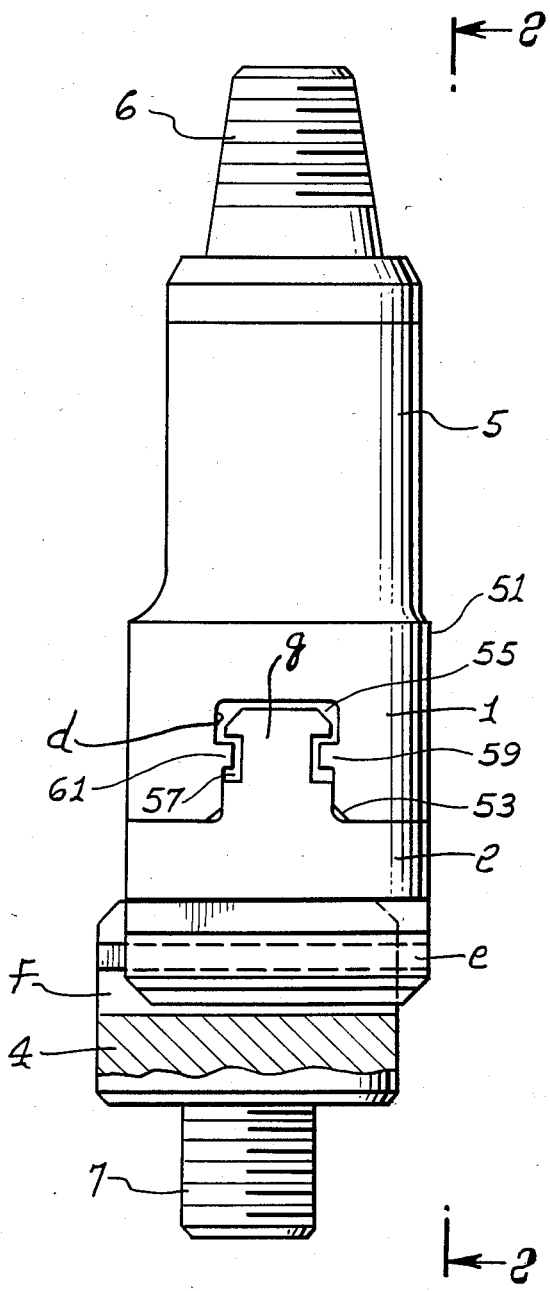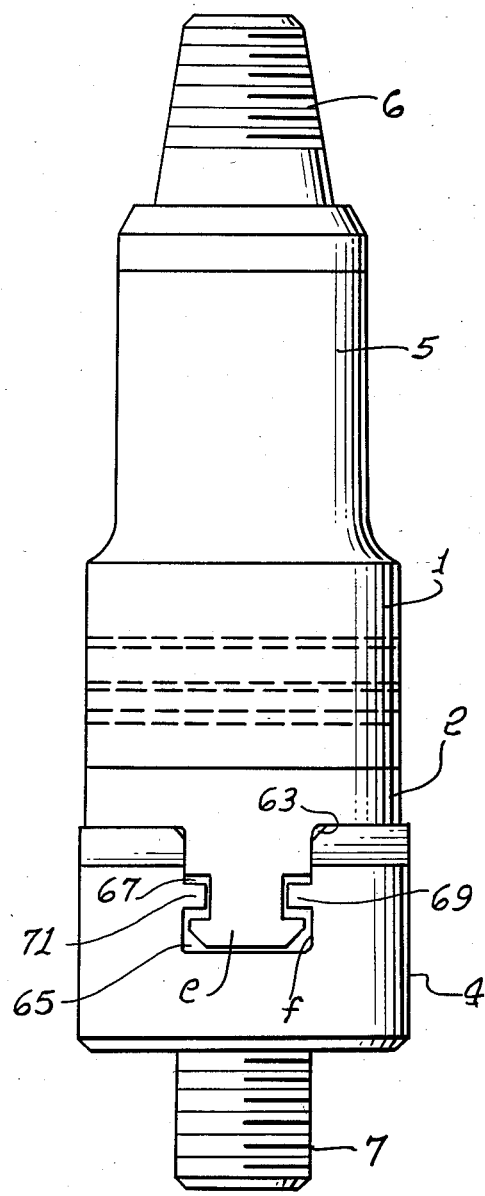

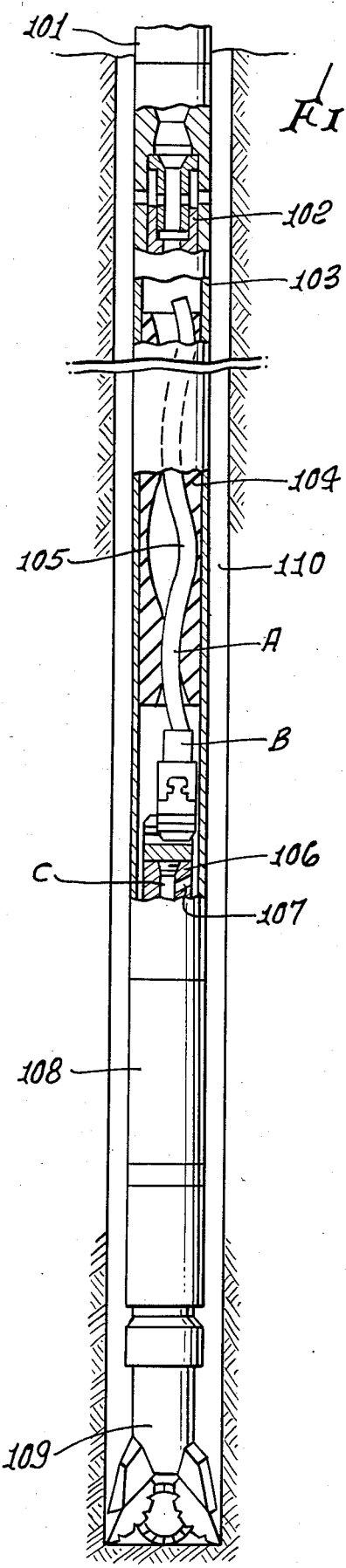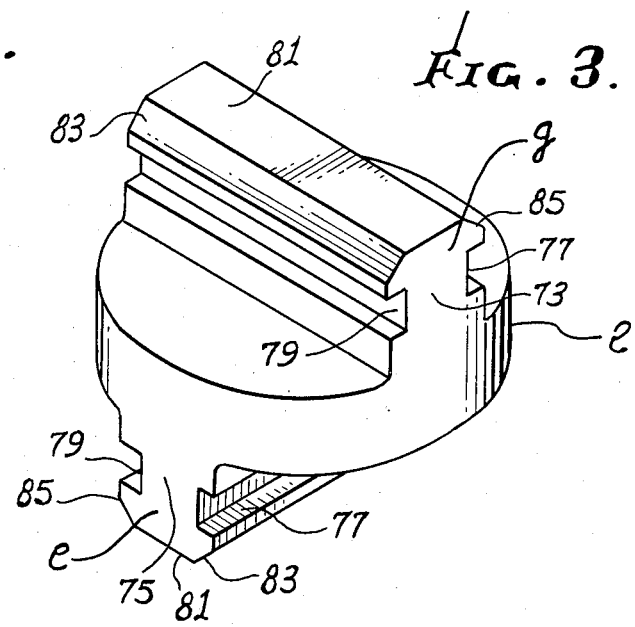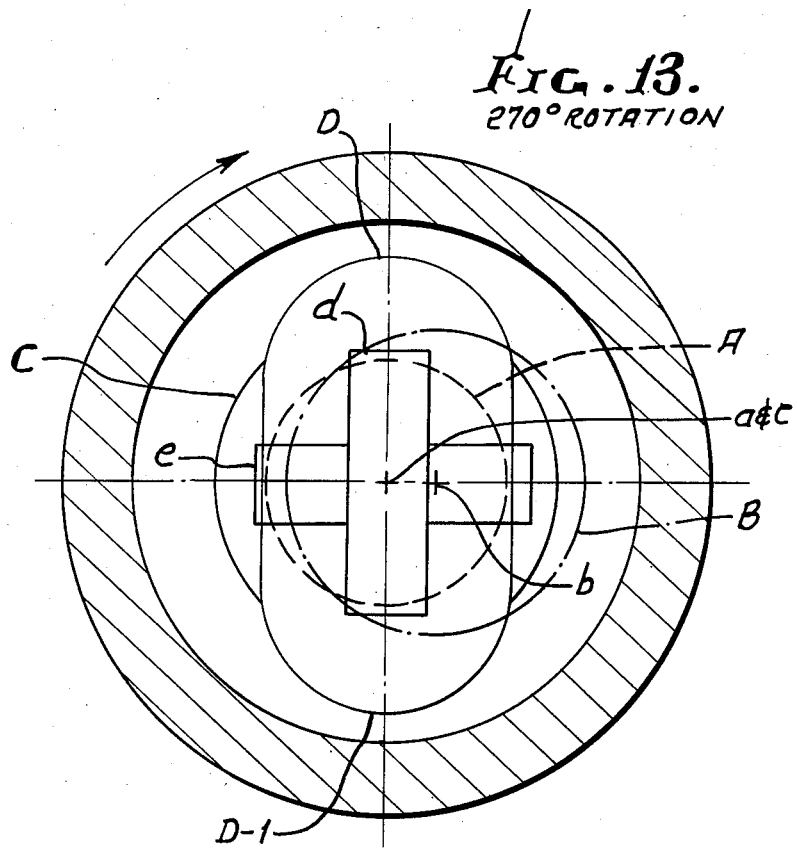

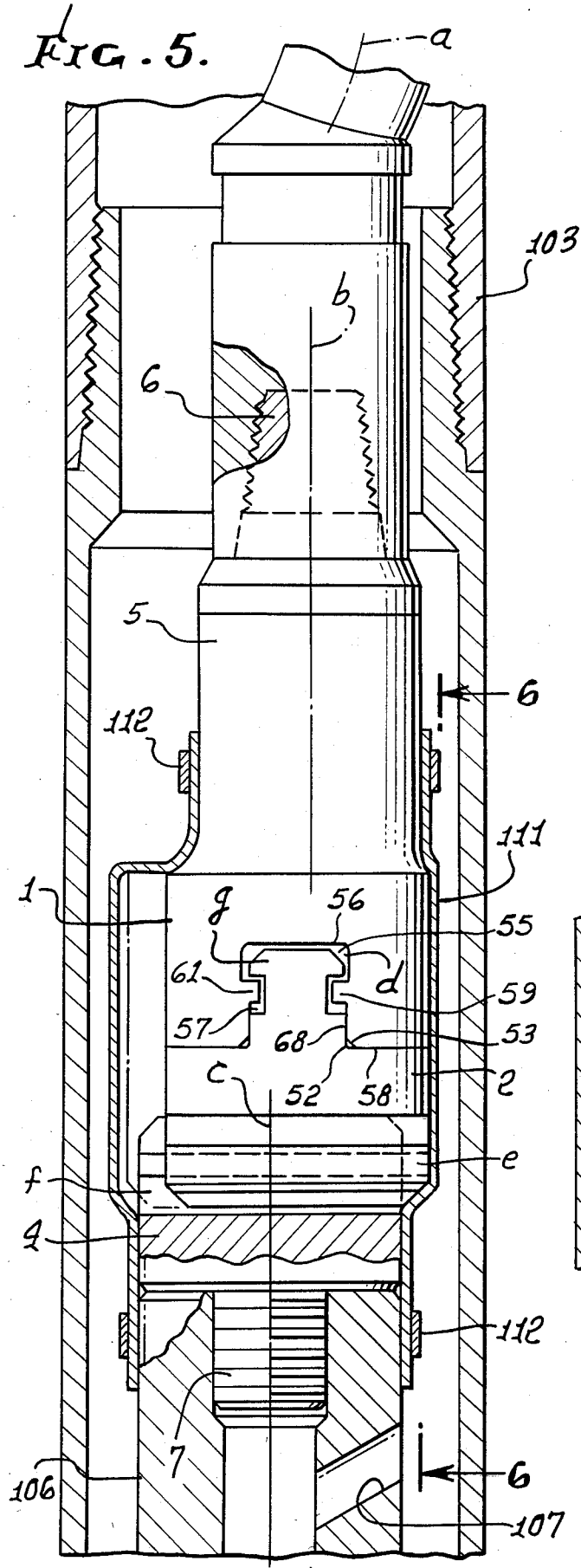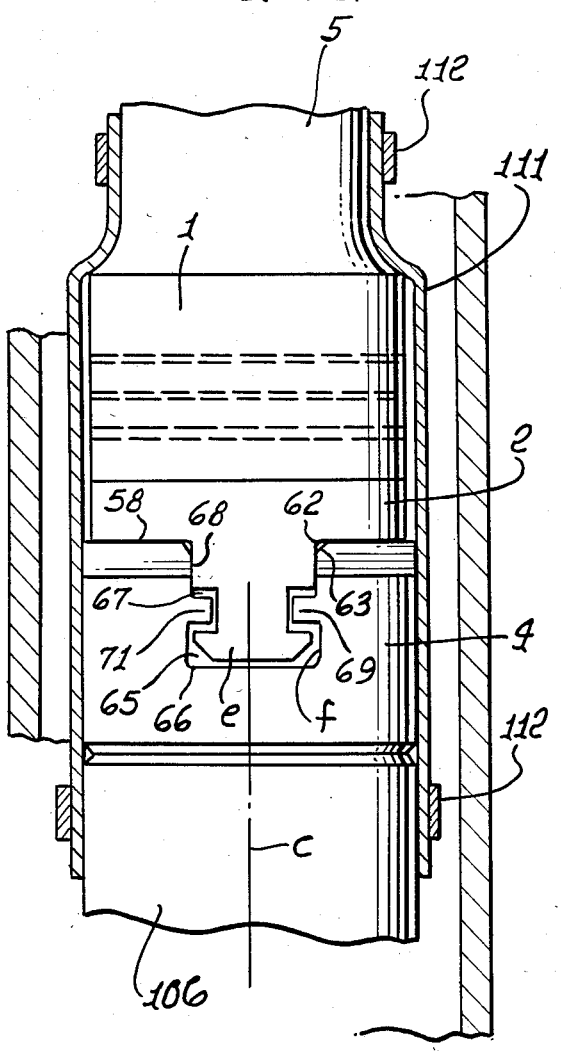

STARTING POSITION

45° ROTATION

90° ROTATION

135° ROTATION

180° ROTATION

225° ROTATION

UNIVERSAL JOINT AND PROGRESSIVE CAVITY TRANSDUCER USING THE SAME

This is a continuation of application Ser. No. 461,937, filed on Jan. 28, 1983, now abandoned.

BACKGROUND OF THE INVENTION

This invention relates to a universal joint which while capable of other functions, as is well known in this art, one of its useful functions is to connect two rotating members whose axis of rotation are not coincident. A particular form of such a joint is the universal joint of the prior art composed of spaced hinges, each connected to a rotating member. Examples of such universal joints are those designed to connect the rotor and shaft of a progressive cavity fluid driven motor described in U.S. Pat. Nos. 3,260,069; 3,260,318; 3,894,818; and 3,999,901.

In such combinations, the rotor which is the driving member, traverses a complex path with respect of the driven shaft member (see U.S. Pat. Nos. 3,894,818 and 3,999,901).

One of the problems with such a connection between the rotor and the driven shaft is the length of the connection between the hinges of the universal joint.

As has been pointed out in the prior art, the connecting rod connecting the rotor to the shaft through the universal joint hinges introduces a bending moment to the shaft which presents problems. (see particularly U.S. Pat. No. 3,982,859 and U.S. Pat. No. 4,029,368.)

STATEMENT OF THE INVENTION

The universal joint of my invention includes a pair of interlocking joints each including a mortise and tenon. The joints are arranged perpendicular to each other. One of the elements of one joint (either the mortise or tenon) may be or is connected to a driving member. One of the elements of the other joint (either the mortise or tenon) may be or is connected to the driven member.

The elements of one of the joints (mortise and tenon) extend in a direction perpendicular to the elements of the other joint.

Mounted between the joints is an idler. The idler is formed on one side of the idler with an element of the joint which is complementary to the element which may be or is connected to one of the rotary members. The reverse side of the idler carries an element (a mortise or tenon) which is complementary to the element (tenon or mortise) which may be or is connected to the other rotary member. The elements formed in the opposite sides of the idler extend perpendicular to each other. Thus, the elements on the opposite sides may be on each side a mortise or a tenon. The complementary element where the element on the idler is a tenon is thus a mortise and vice versa.

The mortise element or the tenon element of the joints and idler may be of many shapes except that they should be displaceable with respect of each other in a direction substantially parallel to the extension of the elements and be interlocked in other directions. An appropriate name for such joints is an interlocking joint and the name will be so used in the specification and claims.

Where the axis of rotation of one of the members, for example a driving shaft, is displaced from a driven shaft, the interlocking joint of my invention will accommodate a wide variation of spacing. The universal joint of my invention is largely independant of manufacturing tolerances which introduces even substantial variations in axial separations.

Furthermore, the axial separation, in the direction of the driven shaft, from the driving members which are connected by the universal joint of my invention may be substantially less than that of the prior art universal joint described above.

The universal joint of my invention is particularly adapted for use with the rotor and driven shaft of the progressive cavity motor of the aforesaid patents.

In such case, while the driven shaft rotates about a fixed vertical axis, the rotor is connected to an extension whose axis orbits about the axis of the driven shaft. The driven shaft is rotated by a crank extending from the rotor extension to the driven shaft.

The universal joint of my invention provides for such crank arm action. It is particularly adpated and is used in the best mode of my invention to transmit the motion of the rotor to the driven shaft.

The invention will be further described by reference to the figures of the drawing which illustrates one embodiment of the best mode of my invention.

FIG. 1 is a front view partly in section of one form of the universal joint of my invention.

FIG. 2 is a view taken along 2—2 of FIG. 1.

FIG. 3 is a perspective view of the idler shown in FIGS. 1 and 2.

FIG. 4 is a view partly schematic of the combination of the universal joint of FIGS. 1 and 2 in an in-hole progressive cavity motor drill assembly.

FIG. 5 is an enlarged view of a portion of FIG. 4.

FIG. 6 is a side view of FIG. 5.

FIGS. 7-13 are diagramatic views illustrating the operation of the unversal joint in the combination shown in FIG. 14.

Figure 7:
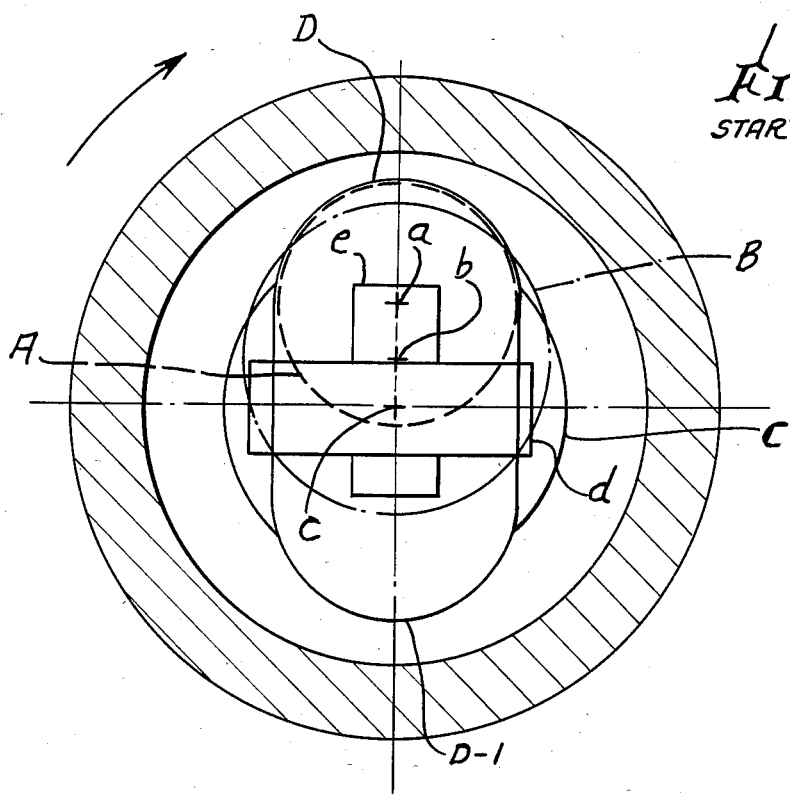
Figure 8:
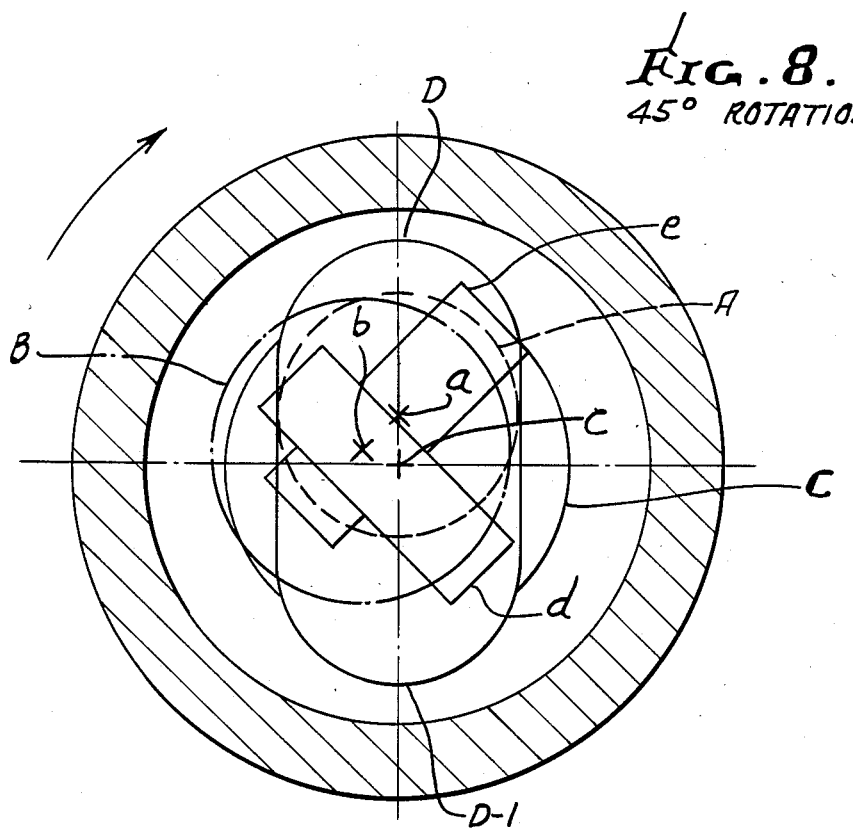
Figure 9:
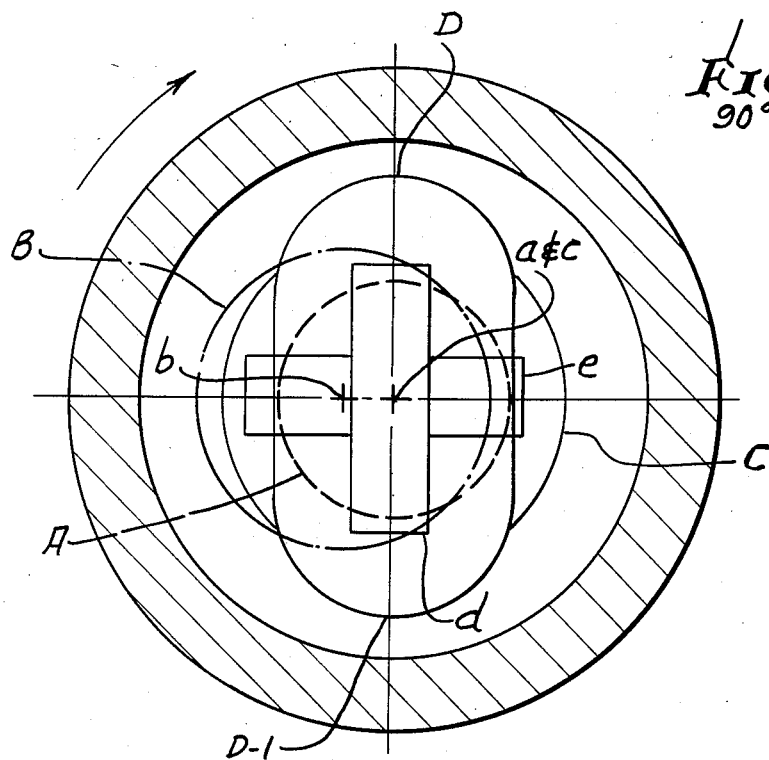
Figure 10:
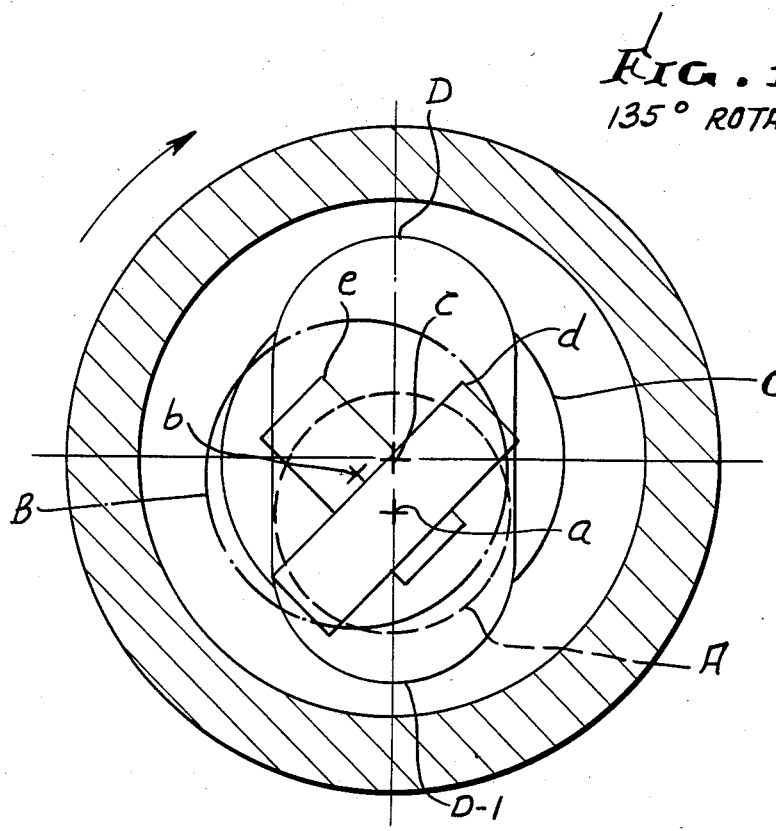

The interlocking universal joint illustrated in FIGS. 1 and 2 is composed of a member 1 which may be the driving member or the driven member of the universal joint. As shown, it is formed with a mortise (d) and a cylindrical extension 5 formed with a screw stud 6. The member 4 which may be the driven or driving member is also formed with a martise and a screw stud 7.

The idler 2, positioned between the members 4 and 1 is formed with a tenon (g) in one side of the member 2, and a tenon (e) on the other side of the member 2.

The tenon (g) extends perpendicular to the extension of the tenon (e).

The tenon (g) is slideably positioned in the mortise (d) of the member 1 and the tenon (e) is slideably positioned in the mortise of the member 4.

The mortise d includes a substantially cylindrical portion 51 providing a first circular crossectional surface having integrally formed therein, a "V" shaped entry way 53 leading to first and second rectangular channels 55, 57. The first and second channels 55, 57 are defined by respective, opposing first rectangular projections 59, 61 such that the width of said first channel 55 is greater than the width of said fourth channel 57.

The mortise f includes a substantially cylindrical portion providing a second circular crossectional surface having integrally formed therein, a "V" shaped entry way 63 leading to third and fourth rectangular channels 65, 67. The third and fourth channels 65, 67 are defined by respective, opposing second rectangular projections 69, 71 such that the width of said third channel 65 is greater than the width of said fourth channel 67.

As shown, the tenons e.g., respectively comprise first and second bars 73, 75 the first and second bars 73, 75 being disposed perpendicularly to one another. Each bar 73, 75 further has oppositely disposed U-shaped channels 77, 79 therein, each disposed for surrounding one of the first and second rectangular projections 59, 61; 69, 71 in a complimentary, spaced apart relation. The top surface 81 of each said first and second bar 73, 75 has first and second beveled surfaces 83, 85 thereon. The "V"—shaped entry ways 53, 63, are disposed opposite radial surfaces 52, 62 which are areas of high stress concentration. The "V" shape of the entry ways precludes force exchange at the radial areas and facilitates manufacturing. The beveled surfaces 55, 65 perform a similar function with respect to opposing radial surfaces 56, 66. The channels e.g. 55, 57 are sized to insure that no load forces are imparted to them by the cooperating tenon e.g. and to facilitate assembly and disassembly. The structure disclosed therefore defines, and directs all high torque forces to, perpendicularly disposed load bearing surfaces 58, 68.

While the form of the mortises and tenons and their location, as illustrated in FIGS. 1 and 2, is my presently preferred embodiment, the configuration of the tenon and mortise of the interlocking joints may be of any configuration which provides for the sliding and interlocking relation, such for example as has been used in mortise and tenon joints used in the prior art to join two members. Furthermore, when a tenon is shown in the figures, a mortise may be positioned to complement the tenon which would be used in place of the mortise shown in the above figures.

The interlocking joint of my invention is adapted for use to connect shafts at least one of which is rotatably mounted about a fixed vertical axis and the axis of the other member may orbit about the fixed axis cause rotation of the member with the fixed axis.

The interlocking joint is thus particularly adapted to connect the helicordal rotor of a progressive cavity transducer with a shaft mounted to rotate about a fixed axis. Where the rotation of the shaft is transmitted to the helicoidal rotor, the transducer acts as a pump. (See Moineau, U.S. Pat. Nos. 2,028,407 and 2,892,217.) Where fluid is pumped through the stator, the transudcer is a motor and the rotor may be connected to a rod which is rotated by the rotor (see patents cited supra).

The relation of the geometry of the joint of my invention to the functions it is required to produce, depends on the kinematic of the progressive cavity transducers which it couples to the rotating fixed axis member.

The kinematics of the interlocking universal joint of my invention which adapts to the kinematics of the progressive cavity transducers is illustrated in the diagrams of FIGS. 5-14.

FIG. 4 schematically illustrates the universal joint of my invention, mounted to connect the rotor of a progressive cavity motor with the shaft of a prior art progressive cavity motor used in a drilling string for rotation of a drill such as drilling of oil or gas bore holes.

As is conventional, the drill string 101 is composed of a kelly, drill pipe, drill collars (not shown). This string is connected to the stator housing 103 which is to be adapted for connection to the drill string through the conventional dump valve 102. The stator 104 is of the conventional elastomeric material and conventional shape, depending on the shape of the rotor 105 (see for example, the above patents). The shape of the stator and rotor illustrated in FIGS. 5-14 is the bifoil form, described at col. 6 of U.S. Pat. No. 3,975,121, but with stator formed as conventional of unitary elastomeric material as in the prior art.

The stator housing is, as usual, connected to the shaft housing and bearing housing 108 by a threaded connection (see FIG. 5).

The rotor 105 is connected to the shaft by the universal joint of the consturction illustrated by FIGS. 1 and 2 as above.

As described in the above patents, and as illustrated by the drawing FIG. 4, see also FIGS. 5-13, the rotor is helicoidal in shape with a circular cross section. The center (a) of all cross section (A) is on a central helix extending parallel to the helicoidal surface of the rotor.

The central axis (b) of the cylindrical extension 5 and the central axis (c) of the driven shaft 106 is illustrated on FIG. 5. The shaft is adapted, as is common in this art, for connection to a drill bit 109 and is shown as so connected in FIG. 4.

The universal joint is guarded from the drilling mud which is pumped down the drill string through the motor and by the hollow shaft 107 as is conventional through the nozzles in the bit 109 and up the annulus 110 up to the surface.

The boot 111 is clamped by clamps 112 about the universal joint and if desired may be filled with lubricant.

The diagrams, FIGS. 7-14, illustrate the transfer of the motion of the rotor to the circular motion of the shaft about its fixed axis (c).

Figure 14:
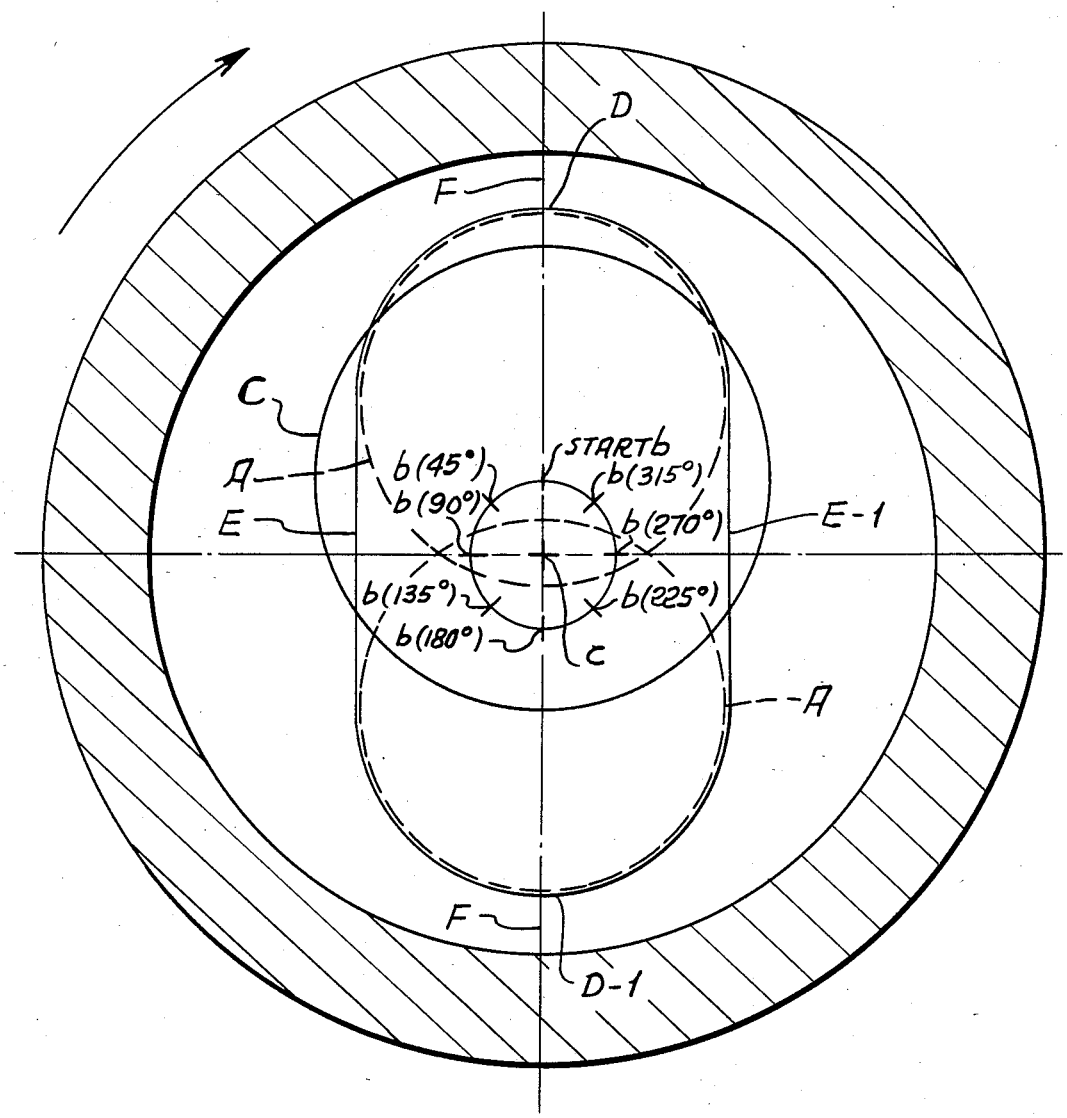
FIG. 14 is a diagramatic view of the orbit motion of the rotor extrusion.

Referring to FIG. 14 (see also FIGS. 5-13), the internal periphery of the cross section of the stator perpendicular to its central axis is formed by two end semicircles D and D1 connected by tangents E and E1. As will be recognized, the angular relation between the orientation of the periphery of the stator at various cross sections along the axis of the stator is a double helix with the diameter of the arcs D and D-1 substantially equal to the diameter of the circular cross section A of the rotor.

As a result of this configuration of the rotor and stator, when the fluid is pumped through the stator and the rotor is rotated, the axis (a) progresses along the major axis F—F of the stator, travelling from one end of the arcs to the other end on 180 degrees of rotation of the rotor and returning to the other end on the final 180° rotation (see FIG. 14).

The kinematics of the universal joint illustrated in FIGS. 1 and 2, when mounted as in FIGS. 5 and 6 is diagrammed in FIGS. 7-13.

As is illustrated by FIG. 5, the helical axis (a) of the helicoidal rotor is centered at each circular cross section A of the rotor and is connected at its terminal end to a cylindrical extension 5 having an axis b (see FIGS. 5 and 6). The universal joint connects the cylindrical extension 5 to the cylindrical shaft 106 whose central axis is (c).

The axis (b) intersects the mortice (d) centrally of mortice (d) and the axis (c) intersects mortice (f) centrally of mortice (f) and are displaced from each other in a direction perpendicular to each axis (see FIGS. 5 and 6).

The diagrams of FIGS. 7-14 assumes that an initial position of the rotor is at the helical groove D of the stator (see FIG. 14). In this orientation the axis (b) of extension 5 and (c) of the shaft 106 will also be positioned as is the axis (a) in line on the major axis (D)—(D1) of the stator.

The axis (f) intersects the mortise (d) and tenon (g) and the central axis c intersects the tenon (e) positioned in the mortise f (see FIGS. 5 and 6). The extension of the e and d are perpendicular to each other. However, the axis c is displaced from the axis a and b as is shown in FIGS. 5, 6 and 7.

The diagrams of FIGS. 7-14 illustrate the relative position of the parts as the rotor rotates through 360° from the position of FIG. 7.

Upon rotation of the rotor through 45° clockwise, the axis (a) at each cross section advances one-quarter of the major axis (see FIG. 8) and the tenon e and the complimentary mortise (f) take a position perpendicular to the mortise d which has rotated 45°.

In the same manner as the rotor continues through the remainder of the 360°, the position of the axis and the mortises and tenons are illustrated in FIGS. 9-14.

In completing its rotation of 90° (see FIG. 9) the axis at (a) becomes coincident with (c) having advanced half way across the major axis D—D-1 and the idler has shifted so that (e) remains perpendicular to (d).

The same geometric relation of (e) and (d) remains so that the linear distance between (a) and (b) and (b) and (c) remain the same in use for all rotations of the rotor (see FIGS. 5 and 14).

On rotation of an additional 45° (see FIG. 10) to 135°, the axis at (a) has advanced an additional one quarter of the major axis D—D-1.

On rotation of the rotor to 180° of its rotation, the axis at (a) has reached the end (D-1) of the major axis.

Figure 11:
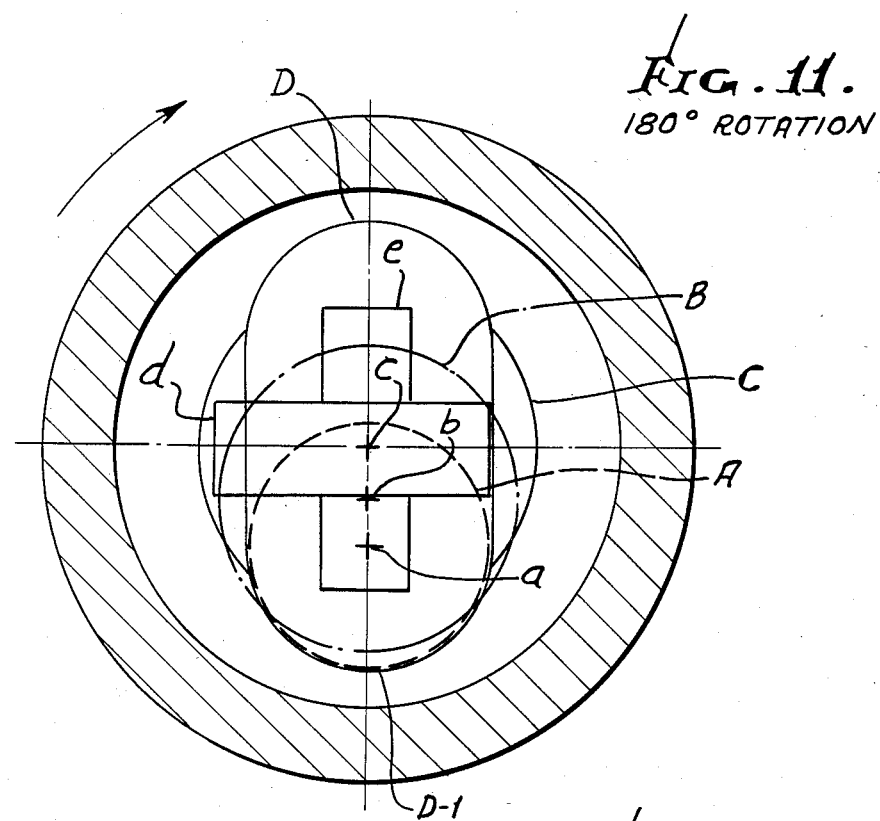
Figure 12:
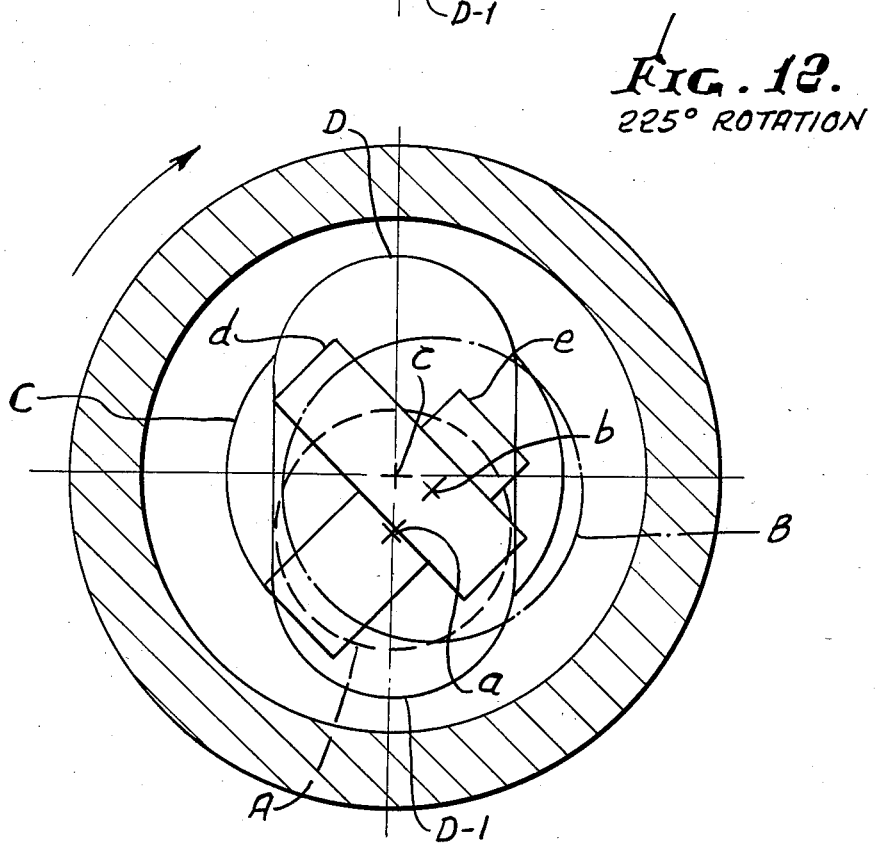

On the remainder of its 360° rotation, the axis at (a) reverses its positions and the mortise and tennons reverse their positions as is illustrated in FIGS. 11-13.

FIG. 14 plots the position of the axis (b) in relation to the axis (c) as the rotor rotates through 360°. As will be seen, the axis (b) orbits about the fixed vertical axis (c) as the rotor rotates through 360°. The radial distance between (b) and (c) is substantially the same at each 45° of rotation of the rotor as is indicated on the diagram of FIG. 14.

The extension 5 (FIG. 5) acts as a crank through the universal joint to transfer the rotation of the rotor to the shaft 106. As the rotor rotates and translates cyclically in the stator 104, this complex motion of the rotor acting through the universal joint cranks the shaft 106.

The universal joint of my invention thus makes possible the integration of complex rotary and linear motions of a driving member and its conversion into rotation about a fixed axis.

In the best mode of my invention, as I presently contemplate it to be, the universal joint is composed of a driving member, a driven member, an idler member positioned between the driving member and the driven member, and a mortise and tennon joint between the driving member and the idler and the mortise and tennon joint between the idler and the driven member, the joint between the idler and the driving member extending in a direction substantially perpendicular to the extension of the joint between the idler and the driven member.

The joint of my invention is pecularily adapted to join the rotor and shaft of a progressive cavity transducer, one of the preferred modes of such use is to connect the rotor and shaft of a progressive cavity motor for driving a drill bit such as is used in drilling a bore hole for an oil or gas well.

The universal joint of my invention minimizes the space consumed by prior art hinge type universal joints employed to connect the rotor and shaft in prior art in-hole motors of the progressive cavity type used in drilling oil and gas wells.

By employing a mortise and tennon connection between the rotor and the shaft of such motors, the transfer of force and crank connection between the rotor and shaft substantially avoids a bending moment on the shaft introduced by the prior art hinge type universal joints and the consequent problems noted above.

I claim:

1. A progressive cavity in-hole adapted for connection to a bit and a drill string, said in-hole motor including, a housing, a stator in said housing, a helicoidal rotor positioned in said stator, a shaft adapted for connection to a drill bit, and a universal joint connected between the rotor and shaft, said universal joint comprising:

a driving member having a substantially cylindrical portion providing a first circular crossectional surface having integrally formed therein, a "V" shaped entry way leading to first and second rectangular channels, said first and second channels being defined by respective, opposing first rectangular projections such that the width of said first channel is greater than the width of said second channel.

a driven member having a substantially cylindrical portion providing a second circular crossectional surface having integrally formed therein, a "V" shaped entry way leading to third and fourth rectangular channels, said third and fourth channels being defined by respective, opposing second rectangular projections such that the width of said third channel is greater than the width of said fourth channel.

an idler member comprising a substantially cylindrical member having first and second tenons formed integrally on opposite circular crossectional end surfaces thereof, said tenons, respectively, comprising first and second bars, said first and second bars being disposed perpendicularly to one another, each said bar having oppositely disposed U-shaped channel means therein each disposed for surrounding one of said first and second rectangular projections in a complimentary, spaced apart relation, and wherein the top surface of each said first and second bar has first and second beveled surfaces thereon.

* * * * *